UNITED STATES PATENT OFFICE.

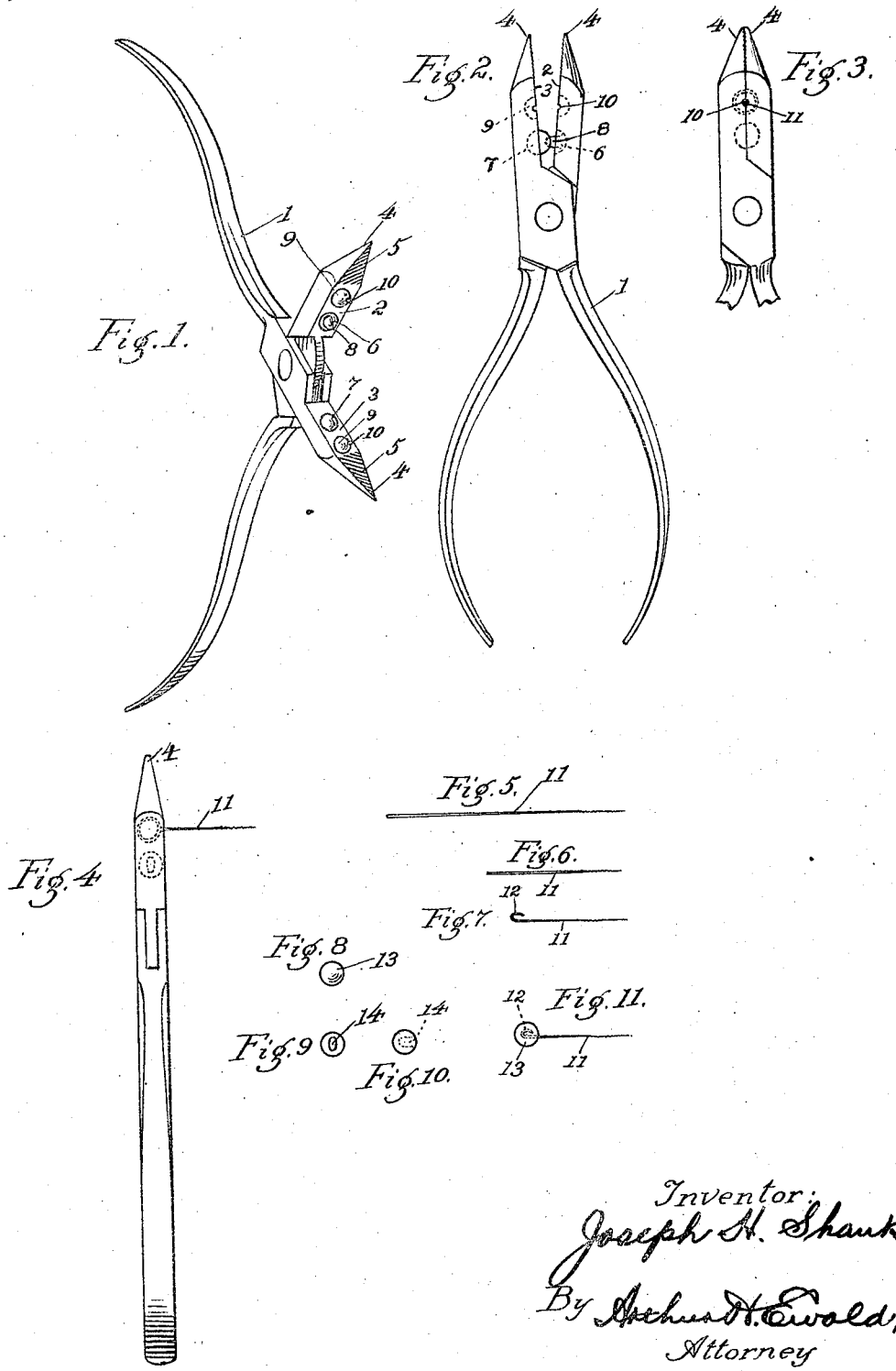

JOSEPH H. SHANK, OF BLANCHESTER, OHIO.

DENTAL TOOL.

1,300,495. Specification of Letters Patent. Patented Apr. 15, 1919.

Application filed June 14, 1918. Serial No. 239,950.

*To all whom it may concern:*

Be it known that I, JOSEPH H. SHANK, a citizen of the United States, and a resident of Blanchester, in the county of Clinton and State of Ohio, have invented certain new and useful Improvements in Dental Tools, of which the following is a full, clear, and exact description, reference being had to the accompanying drawings, forming a part of this specification.

My invention relates to a dental tool adapted to the preparation of dental broaches for certain classes of work.

It frequently happens that a dental broach, as originally constructed, is too long to be advantageously employed in the locality where its use is required, and it thus becomes necessary or desirable to shorten and prepare the broach for such use. For instance, where a nerve is to be removed from a back tooth, the cavity may be inaccessible to a broach of the length ordinarily furnished by the manufacturers. Under such circumstances, it is necessary, in order that the same may be properly employed, that it be first shortened to the proper size for convenient use.

The principal object of my invention is, therefore, to provide a tool by means of which a dental broach, when required for such use, may be conveniently shortened to the proper length, and an operating knob or handle be provided thereon, so that the broach may be conveniently and skilfully manipulated.

Other objects of my invention will appear from the following description thereof.

In the drawings:—

Figure 1 is a perspective of my new dental tool.

Fig. 2 is a side elevation thereof, the jaws being open.

Fig. 3 is a side elevation of a portion of the tool with the jaws closed.

Fig. 4 is an edge view of the tool.

Fig. 5 is a detail of a dental broach before being prepared for use by my new tool.

Figs. 6 and 7 are details of said broach in various steps of treatment by said tool.

Figs. 8, 9 and 10 are details illustrating the preparation of the handle for the prepared broach.

Fig. 11 is a view of the broach with the handle secured thereto.

The numeral 1 indicates a pair of pliers provided with jaws 2 and 3. The said pliers are generally of ordinary construction, and the jaws thereof are provided with bending points 4 and ridged gripping surfaces 5 in the usual manner. The jaws 2 and 3 are provided furthermore with registering depressions 6 and 7, respectively. The depression, 6, is provided with a central point or blade 8, which extends outwardly beyond the face of the jaw 2, as clearly shown in Fig. 2. The said jaws are furthermore provided with registering depressions 9; shallow grooves 10 extend from the depressions 9 to the edges of the jaws.

The numeral 11 indicates a dental broach such as is ordinarily used for the removal of a nerve from a tooth. When it is desired to shorten said broach for convenient use as above mentioned, the shank end of the broach is broken off by means of the pointed ends 4 of the jaws in the ordinary manner, so as to leave the broach of the required length as typically illustrated in Fig. 6. The shank of the broach is then bent over around one of the points 4 of the pliers as illustrated at 12 in Fig. 7.

A convenient and inexpensive handle is provided for the prepared broach illustrated in Fig. 7 by the use of an ordinary B—B shot 13, illustrated in Fig. 8, in the following manner:—The said shot is placed in the depression 7 of the jaw 3 and the jaws are then compressed, causing the blade 8 to enter the shot producing a depression 14 therein. Into this depression of the shot the bent shank 12 of the broach 11 is inserted. The shot is then placed in one of the depressions 9 of the plier jaws with the broach 11 extending outwardly through the connected groove 10, as illustrated in Fig. 4. The jaws are then operated compressing the shot upon the bent shank 12, thus fixedly securing the two together and completing the prepared broach, in which form it is shown in Fig. 11.

The nature and value of my new dental tool will be apparent, to those skilled in the art to which the same appertains, from the foregoing description. It will be understood, of course, that various modifications within the principles above disclosed may be made without departing from the spirit and scope of my said invention and I do not, therefore, limit myself to the specific details set forth.

Having thus described my invention, what I claim as new and desire to secure by Letters Patent is:

1. A dental tool comprising in combination with plier jaws, a pair of registering depressions in said jaws, one of said depressions being adapted to receive a member to be used as a handle for a dental broach, and a blade in the other depression, arranged to produce a depression in said member, the depression, in said member being adapted to receive the shank of said broach.

2. A dental tool comprising in combination with plier jaws, a pair of registering depressions in said jaws, one of said depressions being adapted to receive a member to be used as a handle for a dental broach, a blade in the other depression, arranged to produce a depression in said member, the depression in said member being adapted to receive the shank of said broach, and a second pair of registering depressions in said jaws arranged to hold said member and said broach during the operation of said jaws to compress said member on the shank of said broach.

JOSEPH H. SHANK.

Copies of this patent may be obtained for five cents each, by addressing the "Commissioner of Patents, Washington, D. C."